(12) United States Patent
Shaw (10) Patent No.: US 10,455,277 B2
(45) Date of Patent: Oct. 22, 2019

(54) LINKING DEVICES (71) Applicant: PIKSEL, INC., Wilmington, DE (US)

(72) Inventor: Philip Shaw, York (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/553,856

(22) PCT Filed: Feb. 26, 2016

(86) PCT No.: PCT/EP2016/054137
§ 371 (c)(1),
(2) Date: Aug. 25, 2017

(87) PCT Pub. No.: WO2016/135318
PCT Pub. Date: Sep. 1, 2016

(65) Prior Publication Data
US 2018/0041797 A1 Feb. 8, 2018

(30) Foreign Application Priority Data
Feb. 26, 2015 (GB) .................................. 1503225.3

(51) Int. Cl.
*H04N 7/173* (2011.01)
*H04N 21/436* (2011.01)
(Continued)

(52) U.S. Cl.
CPC ....... *H04N 21/43615* (2013.01); *G06F 21/16* (2013.01); *G06F 21/445* (2013.01);
(Continued)

(58) Field of Classification Search
CPC ......... H04N 21/43615; H04N 21/4394; H04N 21/4508
See application file for complete search history.

(56) References Cited

U.S. PATENT DOCUMENTS

2003/0187798 A1* 10/2003 McKinley .............. G06Q 40/04
705/50
2009/0132715 A1* 5/2009 Puthupparambil ..... H04L 63/08
709/227

(Continued)

OTHER PUBLICATIONS

Search Report under Section 17(5), dated Oct. 3, 2016, UK Intellectual Property Office.

(Continued)

*Primary Examiner* — Olugbenga O Idowu
(74) *Attorney, Agent, or Firm* — Holzer Patel Drennan (57) ABSTRACT

There is disclosed a method of establishing a communication link between first and second devices, the method comprising: receiving a link request from a first device with a first unique identifier; allocating a media content from multiple media content to the first unique identifier; sending the media content to the first device; receiving a media identifier from a second device with a second unique identifier; comparing the media identifier and the media content, and in dependence on identifying a match, transmitting the first unique identifier to the second device and the second unique identifier to the first device, whereby the first and second device can establish a communication link based on the exchanged first and second unique identifiers.

20 Claims, 4 Drawing Sheets

(51) Int. Cl.
  *H04N 1/32*       (2006.01)
  *H04N 21/6547*    (2011.01)
  *G10L 19/018*     (2013.01)
  *G06F 21/16*      (2013.01)
  *G06F 21/44*      (2013.01)
  *H04N 21/439*     (2011.01)
  *H04N 21/45*      (2011.01)
  *H04N 21/8358*    (2011.01)

(52) U.S. Cl.
  CPC ....... *G10L 19/018* (2013.01); *H04N 1/32144* (2013.01); *H04N 21/4394* (2013.01); *H04N 21/4508* (2013.01); *H04N 21/6547* (2013.01); *H04N 21/8358* (2013.01)

(56) References Cited

U.S. PATENT DOCUMENTS

| | | | |
|---|---|---|---|
| 2012/0245722 A1* | 9/2012 | Yamamura | G08C 17/02 700/94 |
| 2012/0297031 A1 | 11/2012 | Danielsson et al. | |
| 2013/0041938 A1* | 2/2013 | Lin | G06F 3/0488 709/203 |
| 2014/0140241 A1 | 5/2014 | Ljung | |
| 2014/0368603 A1 | 12/2014 | Kert et al. | |
| 2015/0127710 A1* | 5/2015 | Ady | H04W 4/21 709/202 |
| 2017/0006335 A1* | 1/2017 | Patel | H04N 21/43615 |

OTHER PUBLICATIONS

International Search Report and Written Opinion, dated May 17, 2017, EPO.

* cited by examiner

LINKING DEVICES

BACKGROUND TO THE INVENTION

Field of the Invention

The invention relates to a technique for establishing a link between devices, particularly but not exclusively to establishing a link between media devices comprising a main media content device and a media content auxiliary device.

Description of the Related Art

It is often necessary to establish a link between two electronic devices so that they can communicate with each other.

Creating such a link can be achieved by each device having the address of the other, or by providing each device with a reference number or code which uniquely identifies the other, and which can then be used as a basis for exchanging messages over a shared communication medium.

The mechanism by which such codes are exchanged is often very simple: an operator or other user can type them into each device directly, and the communication link can thus be established.

However, where one or other of the devices lacks a straightforward or simple means by which such data can be entered directly, or where the identifiers or addresses of the devices are lengthy or complex, the problem is more challenging.

An example of this situation might be a television (TV), set-top box (STB) or other media playback device (a main media content device) that offers an end-user the ability to control it using a smart phone or other similar handheld device, or where the smartphone or handheld device is an accessory of the TV, STB or similar. Such a handheld device (a media content auxiliary device) might function as a remote control or as an interface through which content for playback on the TV/STB can be selected more easily.

A similar requirement pertains for communication in the other direction. The TV/STB might want to show ancillary data on the handheld device during content playback such as a social media stream related to the content or other forms of associated interactivity.

In fact, there are many scenarios in which a media playback device might wish to establish a communication channel with a remote device.

In order to establish a communication channel between devices, both devices must be provided with sufficient information about each other to allow the connection to be configured. However, the unique identifiers for playback devices are long and prone to data-entry issues, while those for smart phones are either inaccessible to end-users or complex. Attempting to enter such an identifier using a TV's traditional remote control presents significant issues to most users.

It is an aim of the invention to provide a technique for establishing a communication link between devices.

SUMMARY OF THE INVENTION

According to an aspect of the invention, there is provided a method of exchanging device information between first and second devices to establish a communication link between the devices, the method comprising: receiving a link request from a first device with a first unique indicator; allocating a link piece of media content from multiple pieces of media content to the first unique indicator; comparing the recognised piece of media content with the multiple piece of media content, and identifying a match with the link piece, transmitting the first unique indicator to the second device and the second unique indicator to the first device, whereby the first and second device can establish a communication link based on the exchanged first and second unique identifiers.

In an aspect the invention provides a method of establishing a communication link between first and second devices, the method comprising: receiving a link request from a first device with a first unique identifier; allocating a media content from multiple media content to the first unique identifier; sending the media content to the first device; receiving a media identifier from a second device with a second unique identifier; comparing the media identifier and the media content, and in dependence on identifying a match, transmitting the first unique identifier to the second device and the second unique identifier to the first device, whereby the first and second device can establish a communication link based on the exchanged first and second unique identifiers.

In an aspect there is provided a computer device for establishing a communications link between first and second devices, the computer device comprising: electronic storage holding multiple media content; and a processor arranged to execute a computer program which, when executed, carries out the steps of the method.

In an aspect a method of establishing a communication link executed at a first computer device seeking to establish the communication link with a second computer device is provided, the method comprising: issuing a link request comprising a first unique identifier; receiving information identifying a media content; accessing and playing out the media content in the vicinity of the second device; and receiving a unique identifier associated with the second device to enable a communication link to be established with the second device.

In an aspect a method of establishing a communication link between first and second devices is provided, the method carried out at a second device and comprising: detecting a media content played out by the first device when in the vicinity of the second device; transmitting a detected media identifier with a second unique identifier; receiving a first unique identifier associated with the first device, the first unique identifier having been accessed based on the detected media identifier which was transmitted; and using the first unique identifier to establish a communication link between the second device and the first device.

A computer device includes a processor arranged to execute a computer program which, when executed, carries out the method.

Embodiments of the present invention address the problem of how to convey sufficient identifying information about one device to another in order for a communication channel to be established in a way that reduces or eliminates data-entry errors. Such a connection may be an ad-hoc, short-lived window for communications, or a long term, persistent connection.

BRIEF DESCRIPTION OF THE FIGURES

For a better understanding of the invention and to show how the same may be carried into effect, reference will now be made by way of example to the figures in which.

DESCRIPTION OF THE PREFERRED EMBODIMENT

The invention is described by way of reference to illustrative examples, but is not limited to any aspect of the examples.

As used herein, the term "media content" is used to refer to any audio clip or video clip that has an audio track within it. An address may identify a location from which media content may be accessed, e.g. a URI identifying the location of an audio clip on another server optimised for file serving.

Figure 1:
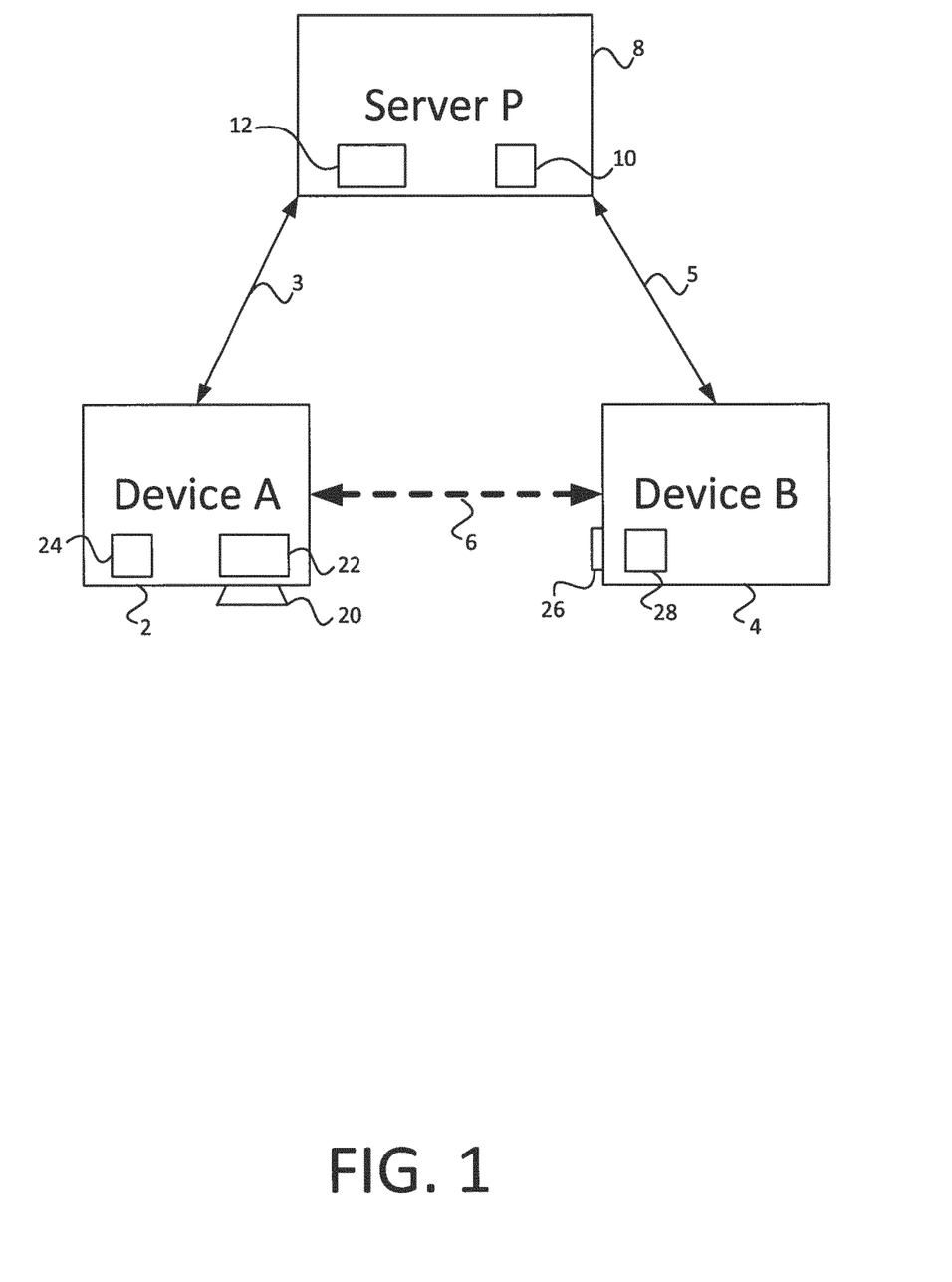
FIG. 1 is a schematic diagram showing the architectural arrangement of two devices in communication with a server.

FIG. 1 illustrates a first media device Device A denoted by reference numeral 2 including a playout module 22, a loudspeaker 20 and a processor 24. Also illustrated in FIG. 1 is a second media device Device B denoted by reference numeral 4 including a microphone 26 and a processor 28. Each of the media devices 2 and 4 are shown to include the elements necessary for understanding the described example, but may include additional elements.

Also illustrated in FIG. 1 is a server device labelled as server P and denoted by reference numeral 8. The server device 8 includes a memory 12 and a processor 10. Only elements of the server device 8 are shown which are necessary for understanding the described example.

The processor 10 of the server device 8 implements a communication setup program. The processor 10 has access to the memory 12. The memory 12 is illustrated in FIG. 1 as part of the server device 8. However the memory 12 may be accessible by the processor 10 either internally of the server device, or externally or in any appropriate way. Code executed by the processor 10 may be stored in the memory 12 or in another memory (not shown).

The server device 8 is connected to each of the media devices 2 and 4 via respective communication links 3 and 5. The communication links 3 and 5 may be provided by any suitable mechanism, for example by a communication system utilising any network, such as an Intranet or the Internet.

There is no connection between the media devices 2 and 4. A desired communication channel between media devices 2 and 4 is shown by a dotted line denoted by reference numeral 6. Both media devices 2 and 4 may have access to the Internet, but know nothing about each other.

In keeping with the examples set out in the background section, the media device 2 may be a TV, an STB or other media playback device. Media device 4 may be a hand-held device which is desired to be used as a remote control for media device 2. In general media device 2 is a main media content device and media device 4 is a media content auxiliary device.

The main purpose of the memory 12 associated with the server device 8 shown in FIG. 1 is to store media content for the purpose of establishing a communication between the media devices 2 and 4.

In the described example, the server 8 maintains a set of segments of audio content in the memory 12. The audio segments may be derived from audio content or video content. The audio segments may be clips of audio content or video content. An audio segment may be an audio track of a video segment.

The example refers to audio segments which are clips of a larger media content. However in general the server 8 may maintain a set of a plurality of media contents, which may each be a part of a larger media content, or may be a media content in itself.

Preferably all audio segments are of a similar length, but each is identifiable as different. This identifiable difference may be achieved by providing an audio watermark or an audio fingerprint with each audio segment.

An audio watermark is a unique electronic identifier embedded in an audio signal. When an audio watermark is used, an audio segment contains an embedded watermark which, when played, is imperceptible to the human ear. A piece of third party software resident on a device can decode the watermark data from the audio data. The device can "strip out" the watermark identifier using the third party software. Methods and software for such decoding are known in the art.

An audio fingerprint, also known as an acoustic fingerprint, is a condensed digital summary, deterministically generated from an audio signal that can be used to uniquely identify an audio sample. When audio fingerprints are used, an audio segment, when played, is perceptibly different to the human ear. A device receives audio data from a microphone, and processes it with third party software that determines the fingerprint and identifies the audio segment based thereon. The identification may be done locally or using a third party server. Methods and software for such decoding are known in the art.

A device may use the same microphone in the detection of both audio watermarks and audio fingerprints. What is important is that each audio segment has a unique identifier, such as an audio fingerprint or audio watermark, allowing an audio identifier to be determined for the audio segment.

The invention is concerned with a technique to establish a communication link between two devices.

The illustrative example describes the invention with reference to the use of audio content, but it will be understood that the invention may be carried out with the use of video content, or more generally any media content.

Figure 2:
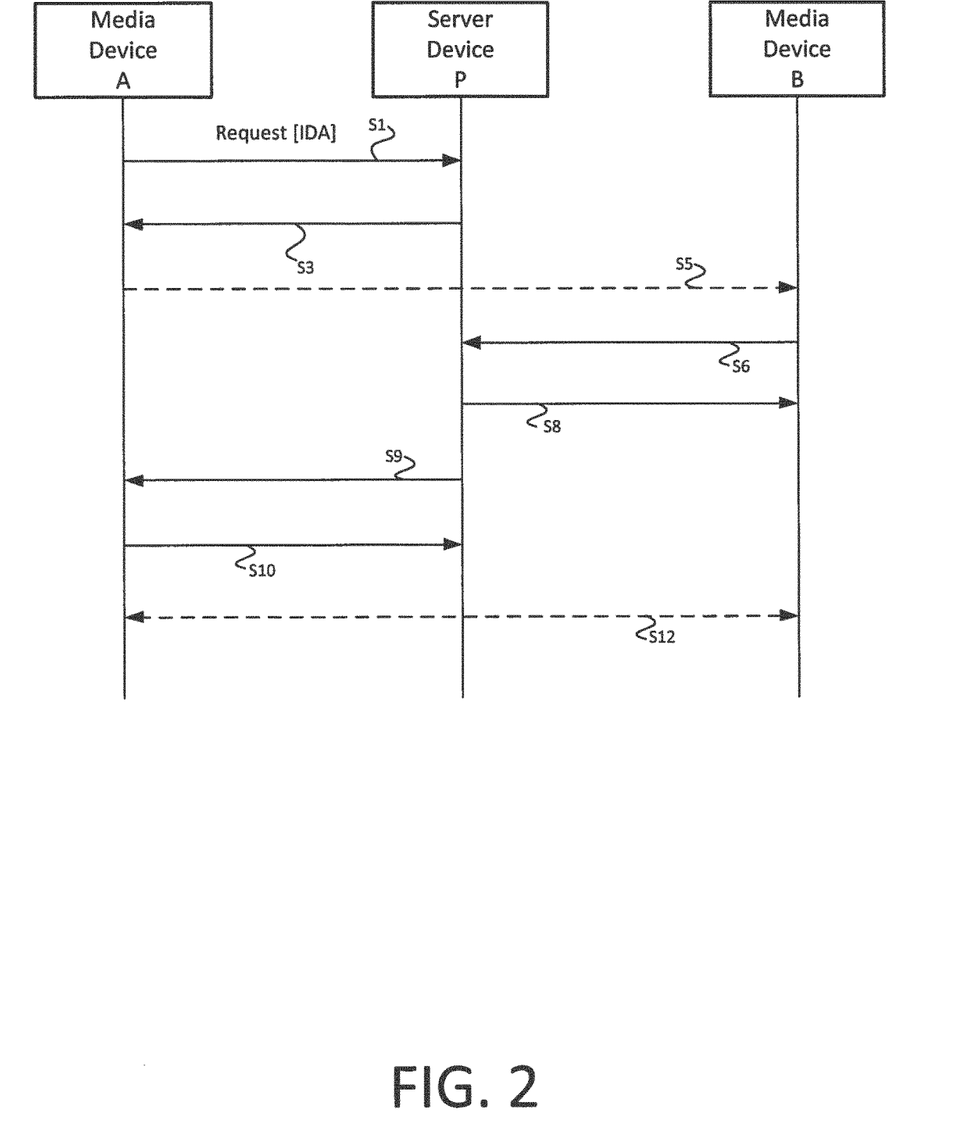
FIG. 2 which is a schematic diagram showing a message exchange in implementing an embodiment of the invention.
Figure 3:
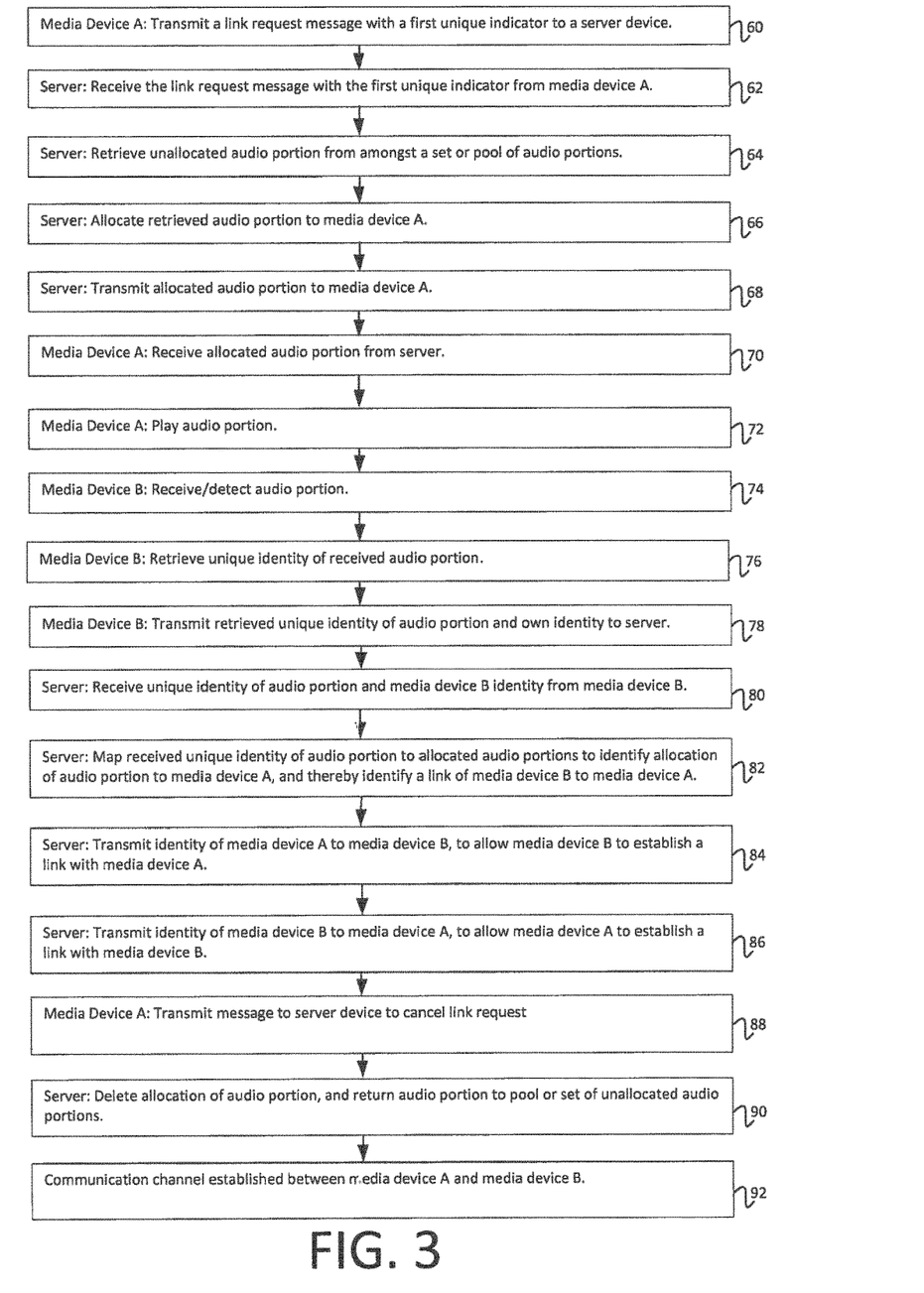
FIG. 3 is a process flow in implementing an embodiment of the invention.

The invention is now described further with respect to FIGS. 2 and 3, which illustrates a message exchange and process flow for the messaging exchange in the architecture of FIG. 1.

Media device 2 wishes to allow another media device to create a communication link with it. In step 60, media device 2 sends a link segment message to the server 8, containing its own unique identifier, and requesting for an audio segment to be allocated to it. This is denoted in FIG. 2 by message S1, which comprises a request from media device 2 to the server device 8 including a unique identifier (ID) of the media device 2, which may be denoted IDA. In addition other data payload information may be exchanged between the media device 2 and the server device 8. Step 62 denotes the receipt by the server of the link request message.

Upon receipt of the message request, as denoted by step 64, the server device 8 retrieves and selects an unallocated or unused audio segment or clip from a pool of such audio segments. The server, as denoted by step 66, marks it as allocated to the media device 2 by storing the unique identifier IDA of the requesting media device.

The unallocated audio segment is denoted C1, and it is stored in a Table T of memory 12. The stored entry is updated in the Table T to be associated with the unique identifier IDA. The audio segment C1 is now allocated to media device 2 having identifier IDA.

With reference to FIGS. 4(a) to 4(c) there is shown table T denoted by reference numeral 30 stored in memory 12 of the server device 8. As denoted in FIG. 3(a), the table 30 includes rows 32, 34, 36, each corresponding to an audio segment CL1, CL2, CL3. A column 38 is headed "clip" and includes the list of the audio segments CL1, CL2, CL3. A column 31 is headed "clip ID" and includes the unique identifier (such as the fingerprint or watermark) for that clip. A column 40 is headed "device id", and lists the devices which have been allocated to the respective audio segments. As shown in FIG. 4(a), initially each of the audio segments CL1, CL2, CL3 is unallocated, and the respective entries in column 40 denote this. The audio portions CL1, CL2, CL3 may be actual audio portions, or may be addresses of where the audio portions are located.

With reference to FIG. 4(b), there is illustrated the Table T 30 after an update following message S1 and step 52. The device ID entry for audio segment C1 in row 32, column 40 is updated to show that it is now allocated to media server 2, by listing IDA.

As shown in FIG. 2, the server device 8 then transmits a message 53 identifying this audio segment to media device 2. The message S3 may include the audio segment C1, or may include a reference to it. For example the message S3 may include a URI at which the audio segment can be retrieved, or an address at the server device 8. The transmission of this message is denoted by step 68 in FIG. 3.

Media device 2 stays in contact with server device 8, for example via periodic polling or a persistent connection.

As denoted by step 70, the media device 2 receives the message from the server. The processor 24 of media device 2 obtains the audio segment C1 with which it has been associated. The playout module 22 of the media device 2 then plays the segment C1 through the loudspeaker 20 as denoted by step 72. Dashed line 55 of FIG. 2 denotes the audio transmission.

The media device 4 uses the microphone 26 and the processor 28 to receive audio data and recognise it as identifiable audio. Identifiable means any audio segment which can be identified using audio fingerprinting (if the audio segments are audibly different) or audio-watermark detection, for example.

The media device 4 monitors content (messages) received at its microphone 26 in this way, and receives the message 55 played by media device 2, as denoted by step 74. The media device 4 identifies any identifier contained in the message 55, which may for example have been encoded in audio watermarking or audio fingerprinting, as denoted by step 76.

Media device 4 then transmits a message S6 including any detected fingerprint/watermark identifier to the server device 8, with its own unique identifier denoted by IDB. Preferably the media device 4 retrieves and transmits the identity of the received audio portion. This is denoted by step 78. Optional additional data payload may also be transmitted with message S6.

As denoted by step 80 the server receives the identity of the audio portion and the identity of the media device from media device 4.

Figure 4:
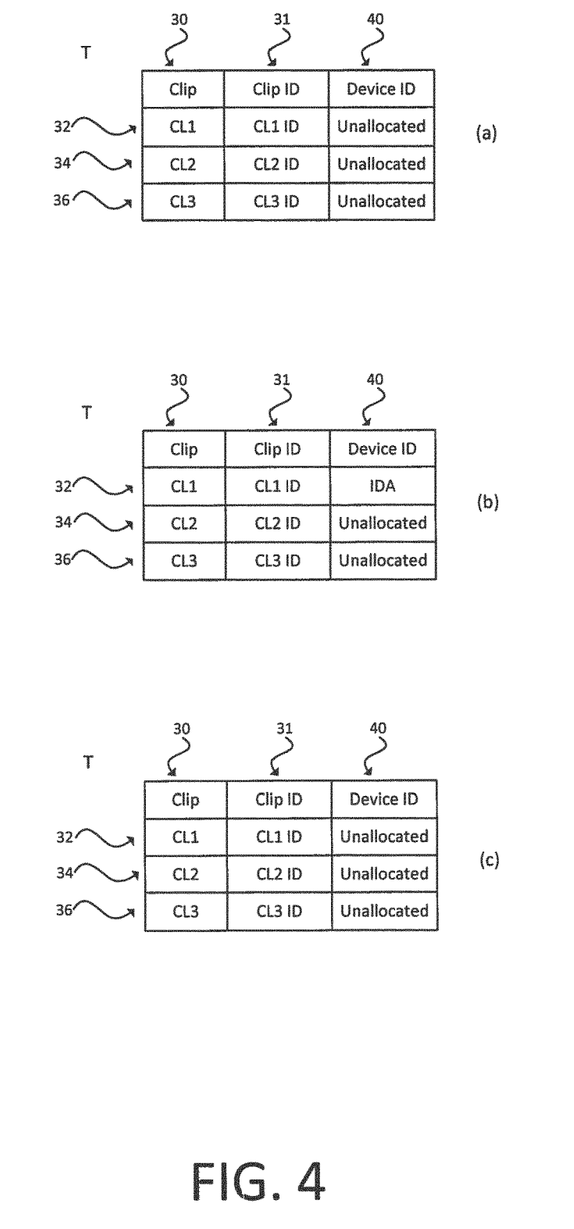
FIGS. 4(a) to 4(c) illustrate a storage in the adaptation in an embodiment of the invention.

As then denoted by step 82, the server device 8 then uses the data in message 56 to identify the audio segment heard by media device 4, and retrieves the unique identifier of the device which played the audio segment. Preferably the server device 8 receives an identity of the audio segment from the media device 4. This may have been retrieved by the media device 4 from the audio fingerprint or watermark in the received content. The server device 8 thus compares the received identity with the identifier of the various segments stored, which may also be stored together with the segments as shown in FIGS. 4 (a) to 4(c).

The server device 8 accesses the table T 30 to retrieve the identifier associated with the audio segment CL1. In the example, the server device 8 retrieves the identifier IDA.

As denoted by step 82, the server 8 thus map the received unique identity of the audio portion to allocated audio portions to identify allocation of the audio portion to media device 2, and thereby identify a link of media device 4 to media device 2.

The server device 8 responds to media device 4 with this link identifier. Thus the server device 8 transmits a message S8 to the media device 4 with identifier IDA. Thereby media device 4 is provided with the media device 2 identifier. This is denoted by method step 34.

The server device 8 additionally transmits the unique identifier IDB of media device 4 to media device 2 using the persistent connection that media device 2 left open as denoted by message S9. This is denoted by method step 86. Any additional data payload provided by media device 4 may also be included in message S9.

Media device 2 acknowledges that it has received the media details of media device 4, and instructs the server 8 to release the audio segment as denoted by message S10. This is denoted by step 88.

As denoted by step 90, the server then returns the audio portion to the pool.

The server device 8 may then mark the audio segment as unallocated, and return it to the pool of available audio segments. Thus as shown in FIG. 4(a), clip CL1 in column 30 is unallocated again.

Media device 2 now has the connection details of media device 4, and media device 4 now has the connection details of media device 2.

The media devices 2 and 4 may now establish a communication channel between each other as shown by connection S12 in FIG. 2 and step 92 in FIG. 3.

A communication channel has been established without an end-user having to enter anything.

A variety of scenarios may initiate the linking technique. Initiation may be triggered during an initial set-up phase, e.g. upon first power up at a device. On initial start-up a device may launch into the described technique. This would allow one device to be configured by a second device.

Alternatively or additionally, a user may request the triggering of the message exchange using, for example, a pairing page offered by a device. The user could then navigate to a corresponding page on another device which causes that device to commence detecting. This may be particularly useful in the case where the first device is a shared device such as a TV, and different members of a household want to watch their content at different times and hence wish to pair their own device with the TV. Their own device may then be used to control the television, e.g. with the use of a playlist on their own device.

The media device 2 may operate a timeout process whereby if, after a certain time, it receives no information back on the persistent connection to the server device 8 it terminates the unfulfilled pairing/exchange attempt and sends a message to the server 8 to return the allocated audio segment to the pool—equivalent to message S10.

The described example utilises audio segments. The invention is not limited to the use of audio segments. For example alternatively or additionally, media device 4 may be provided with a camera for the detection of video or still images. In this embodiment, the playout module 22 of media device 2 comprises a display. The processor extracts a video segment from a message from the server device 8 (for example using a URI or address at the server itself), and the playout module 22 plays out the video segment through the display. Media device 4 is equipped with a camera, and the processor 28 receives video/image data from the camera to recognise identifiable video. Identifiable means any video segment which it can identify, for example using video fingerprinting (if the video segments are visually different) or video watermarking, to extract a video identifier.

Similarly to audio-watermarking described above, video-watermarking may use third party software to decode a human-imperceptible watermark embedded in the video data. Accordingly, video-fingerprinting uses visually different video clips which allow the fingerprint to be calculated.

It is important that each media clip has a unique fingerprint or watermark allowing a media identifier to be determined from the raw media data, and any mechanism for doing so may be used.

More generally, any media content can be utilised, and the invention can employ any technique for identifying the media content.

The same approach can be used to identify a particular device or user to another device. Audio or video watermarks, and fingerprints, can be used to create a convenient mechanism by which authentication credentials can be exchanged in a casual environment.

In the device pairing example described above, the identifying information is simply a device identifier, but it could be any data payload including authentication tokens. The data payload may serve an additional function other than just unique identification.

While the use of audio or video for this exchange may not initially appear very secure (someone listening could record and replay the audio/video), this is not an issue if the authentication payload being exchanged is merely a one-time token. The convenience offered by the solution is the ease of transferring this complex data structure from one device to another.

One-time tokens can be safely overheard since they can only be used once.

The processes described herein may be implemented as software on a server device, media device, or both. The software may be implemented on one or more devices.

The invention has been described by way of example with reference to an example and variation thereof. The invention is not limited to the example, the variations, or any aspect thereof. Parts of examples or variations may be combined differently to how described. The scope of protection is defined by the appended claims.

The invention claimed is:

1. A method, implemented at a computer device, of establishing a communication link between a first device and a second device, the method comprising:
   storing, at the computer device, a plurality of media segments;
   marking, at the computer device, any of the plurality of media segments which have been allocated;
   receiving from the first device, at the computer device, a message including a link request and a unique identifier of the first device;
   selecting, at the computer device, an unallocated media segment;
   allocating, at the computer device, the selected unallocated media segment to the unique identifier of the first device;
   marking, at the computer device, the selected unallocated media segment as allocated to the unique identifier of the first device;
   sending, from the computer device, the marked selected media segment to the first device;
   receiving from the second device, at the computer device, a message including a media identifier and a unique identifier of the second device;
   identifying, at the computer device, a media segment associated with the media identifier;
   comparing, at the computer device, the media segment associated with the media identifier and the stored plurality of media segments;
   identifying, at the computer device, a match between the media segment associated with the media identifier and the stored plurality of media segments;
   retrieving the unique identifier of the first device, associated with the retrieved media segment;
   transmitting, from the computer device, the unique identifier of the first device corresponding to that match to the second device; and
   transmitting, from the computer device, the unique identifier of the second device to the first device, whereby a communication link is established between the first and second devices based on the exchanged unique identifiers.

2. A method according to claim 1, wherein the step of allocating the selected unallocated media segment comprises selecting the selected unallocated media segment from multiple unallocated media content held in an electronic storage.

3. A method according to claim 1, further comprising the step of returning the selected unallocated media segment to a store of unallocated media content after it has been used in identifying the match.

4. A method according to claim 1, wherein the selected unallocated media segment is one of an audio content and a piece of video content.

5. A method according to claim 4, wherein the audio content is an audio track associated with a video clip.

6. A method according to claim 1, carried out at a server in communication with the first and the second devices via a communication system.

7. A method according to claim 1, further comprising the step of establishing a persistent connection to the first device after receiving the link request, wherein the step of transmitting the unique identifier of the second device to the first device takes place over the persistent connection.

8. A method according to claim 1, wherein one or both of the unique identifiers are device identifiers, and wherein one or both of the unique identifiers includes an authentication token issued by one of the first and the second devices.

9. A method according to claim 1, wherein the selected unallocated media segment includes audio data which, when played out by the first device, generates an audible signal.

10. A method according to claim 1, wherein the selected unallocated media segment includes one of an audio watermark and a video watermark which, when played out by the first device, is detectable by the second device.

11. A method according to claim 1, wherein the selected unallocated media segment includes video data which, when played out by the first device, generates a visible signal.

12. A computer device for establishing a communication link between a first device and a second device, the computer device comprising:
   electronic storage holding multiple media content; and
   a processor arranged to execute a computer program which, when executed, carries out the steps of claim 1.

13. A method, at a first device, of establishing a communication link with a second device, the method comprising:
   issuing a link request from the first device to a computer device, the link request comprising a unique identifier of the first device;
   receiving, at the first device from the computer device, information identifying a media segment, wherein the media segment is selected at the computer device as an unallocated media segment and then allocated and marked at the computer device to the unique identifier of the first device;
   accessing and playing out, at the first device, the media segment in a vicinity of the second device, wherein the second device transmits to the computer device a message including the media segment and a unique identifier of the second device, wherein the computer device compares the media segment to a stored plurality of media segments, to retrieve the unique identifier of the first device which is allocated to the media segment;
   receiving, at the first device from the computer device, a second unique identifier associated with the second device; and
   enabling the communication link between the first device and the second device using the second unique identifier received at the first device.

14. A method according to claim 13, wherein the information identifying the media segment is a uniform locator to identify and access the media content.

15. A computer device including a processor arranged to execute a computer program which, when executed, carries out the steps of claim 13.

16. A method of establishing a communication link between a first device and a second device, the method carried out at the second device and comprising:
   detecting, at the second device, a media segment played out by the first device when in a vicinity of the second device, wherein the media segment is selected at a computer device as an unallocated media segment, allocated and marked at the computer device to the unique identifier of the first device, and then transmitted from the computer device to the first device;
   transmitting, from the second device to the computer device, a message including the detected media segment and a unique identifier of the second device, wherein the computer device compares the media segment to a stored plurality of media segments, to retrieve a unique identifier of the first device which is allocated to the media segment;
   receiving, at the second device from the computer device, the unique identifier of the first device; and
   enabling the communication link between the second device and the first device using the first unique identifier received at the second device.

17. A method according to claim 16, wherein the step of detecting the media segment comprises detecting a watermark in a media clip.

18. A method according to claim 16, wherein the media segment is one of an audio segment and a video segment.

19. A method according to claim 18, wherein the step of detecting the audio segment includes detecting an audible signal using a microphone, and wherein the step of detecting the video segment includes detecting a visual signal using a camera.

20. A computer device including a processor arranged to execute a computer program which, when executed, carries out the steps of claim 16.

* * * * *